United States Patent [19]

Harrison

[11] Patent Number: 4,899,773

[45] Date of Patent: Feb. 13, 1990

[54] VALVE APPARATUS AND METHOD

[75] Inventor: Donald G. Harrison, Phoenix, Ariz.

[73] Assignee: Allied-Signal Inc., Phoenix, Ariz.

[21] Appl. No.: 258,229

[22] Filed: Oct. 14, 1988

[51] Int. Cl.⁴ ............................................. F16K 17/36
[52] U.S. Cl. .......................................... 137/1; 137/38;
  137/43; 244/135 R
[58] Field of Search ................... 137/1, 38, 39, 43, 45;
  244/135 R

[56] References Cited

U.S. PATENT DOCUMENTS

| | | |
|---|---|---|
| 935,957 | 10/1909 | Blossom . |
| 1,363,606 | 12/1920 | Loudon . |
| 2,245,198 | 6/1941 | Hunter et al. . |
| 2,262,746 | 11/1941 | Allen . |
| 2,324,464 | 7/1943 | Parker .................................... 137/38 |
| 2,737,418 | 3/1956 | McChesney ....................... 137/45 X |
| 2,831,490 | 4/1958 | Simcock ................................ 137/38 |
| 2,919,707 | 1/1960 | Seidler . |
| 2,934,077 | 4/1960 | Whiting ................................ 137/38 |
| 2,942,611 | 6/1960 | Klank, Jr. et al. ..................... 137/43 |
| 2,942,612 | 6/1960 | Klank, Jr. ............................. 137/43 |
| 3,685,528 | 8/1972 | Holland ................................ 137/43 |

Primary Examiner—Robert G. Nilson
Attorney, Agent, or Firm—Terry L. Miller; James W. McFarland

[57] ABSTRACT

A gravity and acceleration responsive valve apparatus having a housing with a number of inlet ports through which communication is controlled by respective valve members. The valve members in conjunction with space maintaining weight transfer means movable in the housing respond to acceleration force and to gravity to open only selected inlet ports while maintaining all other ports closed. The valve has utility particularly as a tank vent or liquid pickup valve aboard aircraft.

22 Claims, 3 Drawing Sheets

VALVE APPARATUS AND METHOD

TECHNICAL FIELD

The present invention is in the field of gravity and acceleration responsive valve apparatus and method. More particularly the present invention relates to a valve apparatus employed for venting of air from or for obtaining delivery of air-free liquid from a tank positionable in tilted or inverted attitudes. As such, the inventive valve apparatus and method has particular utility for use aboard aircraft for venting air from a lubricating oil tank or for supplying air-free liquid from a fuel tank.

BACKGROUND OF THE INVENTION

Several conventional valves possibly relevant to the present invention are known to the applicant and are listed in the tabulation below:

| U.S. Pat. No. | Issued | Inventor |
| --- | --- | --- |
| 2,324,464 | 20 July 1943 | A. L. Parker |
| 2,831,490 | 22 April 1958 | W. H. Simcock |
| 2,934,077 | 26 April 1960 | J. C. Whiting |
| 2,942,611 | 28 June 1960 | W. C. Klank, Jr. et al |
| 2,942,612 | 28 June 1960 | W. C. Klank, Jr. |
| 3,685,528 | 22 August 1972 | J. L. Holland |

All of these valves involve compromises made in view of often times conflicting design interests. Among these design interests are low cost, positive operation, avoidance of liquid slugging in venting use, and avoidance of air entrainment in liquid pickup use. Also, relative ease of maintenance, or the complete freedom from the need for maintenance, is highly desirable because these valves are often installed in inaccessible locations. Because these valves are intended for aerospace applications small size and light weight are very important. Unfortunately many of the conventional valves are relatively complex in their structure or are expensive to manufacture or difficult to maintain. Also some known valves are larger and/or heavier than is desired for use in aerospace applications. Also, under certain operating conditions certain of these conventional valves may allow liquid slugging from the vent when they are used to vent a tank, such as an oil tank, or they may allow entrainment of air when used to pick up a liquid fuel from a fuel tank.

SUMMARY OF THE INVENTION

In view of the deficiencies of the current technology, the applicant wishes to provide a valve which is simple and very reliable in its construction, which is comparatively lightweight and small, and which because of its simplicity of design is both inexpensive to manufacture and easy to maintain.

Accordingly, the present invention provides a valve apparatus responsive to gravity, said apparatus comprising: a housing defining an internal cavity, a plurality of inlet ports opening to said cavity at respective ones of the apices or vertices of a regular polygon or regular polyhedron, said housing defining one of a respective plurality of inwardly disposed valve seats at each of said plurality of inlet parts, said valve seats each being disposed generally perpendicularly to a line extending between the respective apex or vertex and the geometric centroid of said polygon or polyhedron, a plurality of movable weighty and non-buoyant valve balls each in a respective first position sealingly engaging a respective one of said plurality of valve seats to close communication through the associated inlet port, guide means for guiding each of said plurality of valve balls linearly along a path extending generally between the respective apex or vertex and said centroid, and movable space maintaining weight transfer means for both maintaining a selected minimum distance between adjacent ones of said plurality of valve balls and for transferring weight from upper ones of said plurality of valve balls to lower ones thereof to both sealingly engage the latter with said housing and to allow movement of said upper valve balls to a second position wherein the latter are unseated and the respective inlet port opened, said housing defining an outlet port opening from said cavity.

DESCRIPTION OF THE PREFERRED EMBODIMENTS

Figure 1:
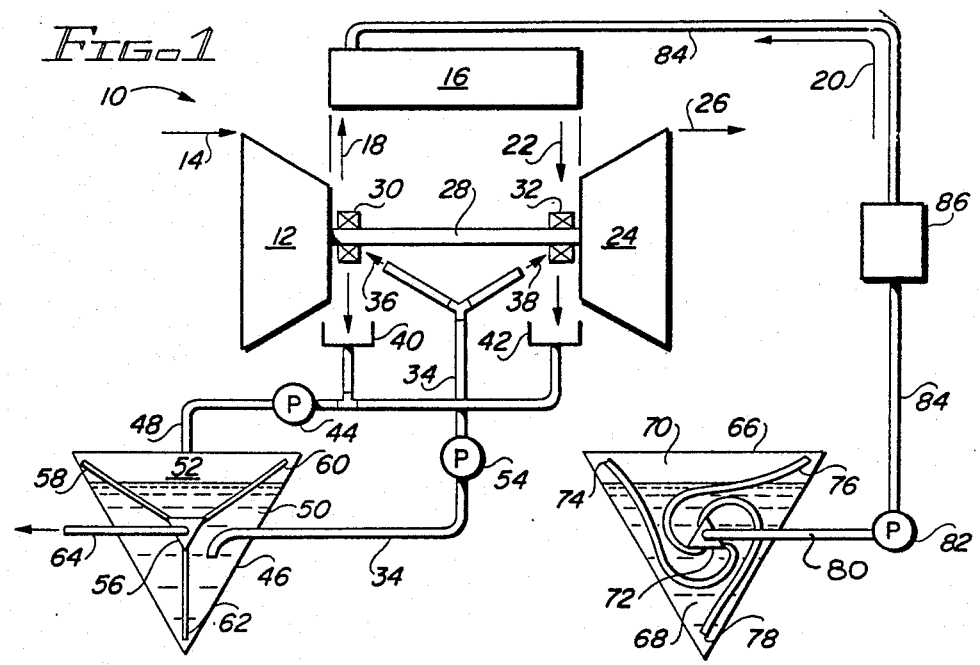
FIG. 1 schematically depicts a turbine engine having both an oil tank from which is desired to vent air and a fuel tank from which it is desired to pickup air-free fuel.

FIG. 1 schematically depicts a turbine engine (10) including a compressor (12) inducting ambient air as is depicted by arrow (14) and delivering this air pressurized to combustor (16) as is depicted by arrow (18). A flow of fuel as is depicted by arrow (20) is mixed with the pressurized air in combustor (16) to support combustion producing a flow of high temperature, high pressure combustion products, as is depicted by arrow (22). The combustion products are expanded in a turbine (24) and vented to ambient as is depicted by arrow (26) to drive a shaft (28). The shaft (28) rotatably drives the compressor (12). The shaft (28) is rotatably journalled in a pair of bearings (30, 32) which are supplied with a flow of lubricating oil via a conduit (34) as is depicted by arrows (36, 38). After lubricating the bearings (30, 32) the oil drops into respective sumps (40, 42) from the bearings (30, 32). A scavenging pump (44) removes the oil from sumps (40, 42) along with a considerable quantity of entrained air and delivers this air and oil mixture to an oil tank (46) via a conduit (48). While the tank (46) is depicted as of triangular shape in cross section for ease of illustration, the tank may be of any convenient shape. In the aerospace art it is conventional to employ oil tanks which are conformal to the turbine engine which they serve, and to which they are mounted. In such a case, the oil tank (46) may be generally arcuate in one aspect so as to conform to the generally cylindrical housing of the turbine engine (10). In another aspect, the oil tank may have an irregular shape so as to be accommodated between the turbine engine (10) and an engine nacelle which houses the engine upon an aircraft. In view of the above, it is to be clearly understood that the triangular shape of tank (46) (and of tank (66)) is for purposes of illustration only. Within the tank (46) the oil and air mixture separates such that the lower portion of the tank contains a quantity of substantially air-free oil (50) while the upper portion of the tank contains an air filled ullage volume (52). A pump (54) receives oil from the lower portion of tank (46) and delivers this oil to the bearings (30, 32) via the conduit (34).

In order to vent air from the tank (46) which has been received via the conduit (48) and separated from the oil (50), a gravity and acceleration responsive valve apparatus (56) is disposed within the tank (46). The valve (56) includes three air inlet conduits (58, 60, 62) two of which open at their respective distal ends in the ullage volume (52) of the tank (46). The remaining air inlet conduit (62) opens below the surface of the oil (50). An outlet conduit (64) extends from the valve apparatus (56) and communicates outwardly of the tank (46). The conduit (34) communicates oil (50) to the pump (54).

In order to provide fuel to the combustion engine (10), a fuel tank (66) is provided wherein is disposed a quantity of liquid jet engine fuel (68). The fuel tank (66) also contains an air filled ullage volume (70) in an upper portion thereof. A gravity and acceleration responsive valve apparatus (72) is disposed within the fuel tank (66). Three fuel inlet tubes (74, 76, 78) extend from spaced apart locations upon the valve (72) and are wrapped partially thereabout in order to extend to diametrically opposite locations within the fuel tank (66). A conduit (80) connects the valve apparatus (72) with a fuel pump (82) from which fuel is supplied via a conduit (84) and fuel flow controller (86) to the combustor (16).

Figure 2:
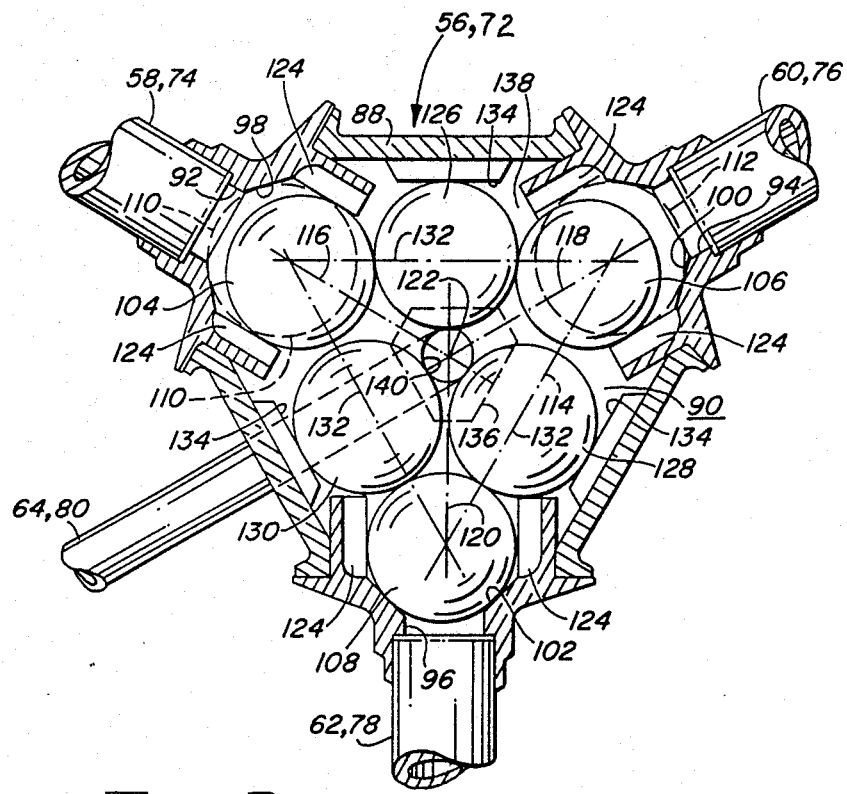
FIGS. 2 and 3 depict partially cross-sectional views of one embodiment of the inventive valve in two alternative rotational positions.

Viewing FIG. 2 it will be seen that each of the valves (56, 72) is the same in construction and include a housing (88) defining therein a chamber (90). The housing (88) also defines three equally spaced apart inlet ports (92, 94, 96) opening into the chamber (90). Each of the inlet ports (92, 94, 96) opens in a respective inwardly disposed valve seat (98, 100, 102). Three metallic ball valve member (104–108) are movably disposed in the chamber (90), one at each one of the inlet ports (92–96). As depicted in FIG. 2 the valve member (108) is in its first or sealing position in engagement with the housing (88) at valve seat (102). The other two valve members (104, 106) also may occupy a first or sealing position in engagement with their respective valve seats as is depicted in dash lines (110, 112). It will be seen that when the three valve members (104–108) occupy their first or sealing positions in engagement with the housing (88) the centers of these valve members define an equillateral triangle which is depicted by dash lines (114). Each one of the valve members (104–108) is guided along a respective path (116–120) extending from the respective apex of the triangle (114) to the centroid (122) thereof by respective multiple spaced apart pairs of ribs, generally referenced with the numeral (124) extending from the housing (88) inwardly of the chamber (90). Interposed between each adjacent pair of the valve members (104–108) is one of three metallic ball space maintaining weight transfer members (126–130). Each one of the spherical space maintaining and weight transfer members is guided along a respective path, generally referenced with the numeral (132) which comprises a side of the equillateral triangle (114), by respective lands (134) extending from the housing (88) inwardly of the chamber (90). In combination with the lands (134), the housing defines a plurality of shoulders (136) extending both from the back wall (138) and from the front wall (not visible in FIG. 2) and cooperating with the lands (134) to guide the members (126–130) along paths (132). An outlet port (140) opens to the chamber (90) through the back wall (138) intermediate of the shoulders (136).

Viewing now FIG. 2 in greater detail it will be seen that the valve member (108) in its first position sealingly engages the valve seat (102) of housing (88). Each of the space maintaining and weight transfer members (128, 130) lie against the valve member (108) to transfer their weight thereto and assist in sealingly engaging this valve member with the valve seat (102). On the other hand, each of the valve members (104, 106) occupies its respective second position spaced from its respective valve seat (98, 100). These two valve members are prevented from escaping from their respective paths (116, 118) between the ribs (124) by their contact with the space maintaining member (126).

Figure 3:
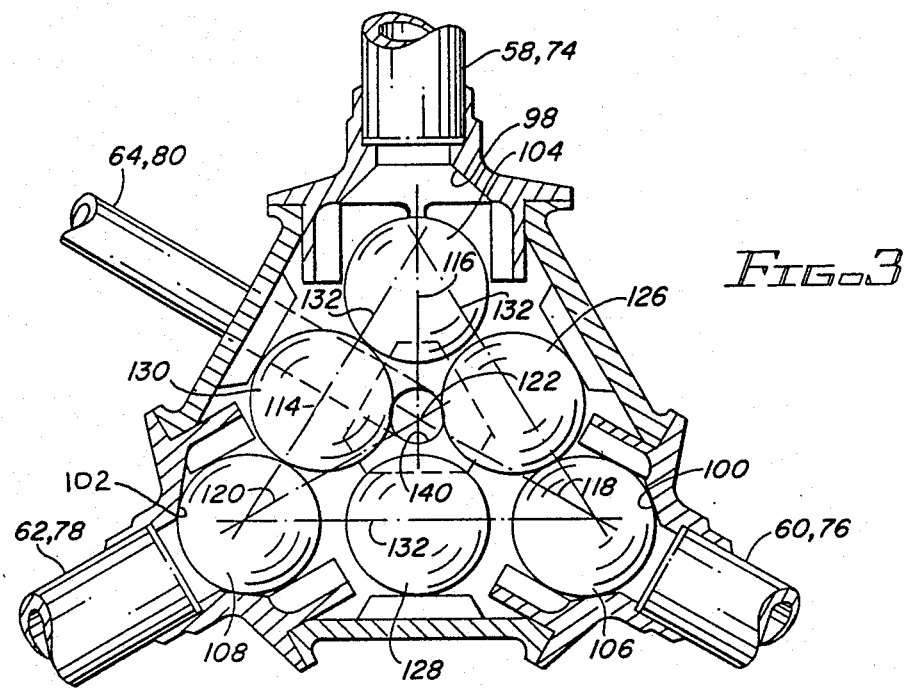

Viewing now FIG. 3 it will be seen that if the valve apparatus (56, 72) is rotated 60 degrees clockwise the valve member (108) will be maintained in sealing contact with its respective valve seat (102) while the valve member (106) is moved into sealing contact with its respective valve seat (100) by its own weight and the weight of the space maintaining member (126) and valve member (104) transferred thereto. That is, each of the valve members (106, 108) is urged into sealing engagement with its respective valve seat both by their own weight, and by the weights of the space maintaining members (126, 130) bearing thereon, along with the weight of the valve member (104) which alone occupies its second position unseated from its respected valve seat (98). In view of the above it is easily seen that as the valve apparatus (56, 72) is rotated in the plane of the equillateral triangle (114) only the upper one or two inlet ports is opened while the lower one or two inlet ports is always maintained closed, dependent upon the rotational position of the valve apparatus with respect to the prevailing acceleration vector or the downward direction of the vertical.

Returning now to a consideration of FIG. 1, it will be seen that if the valve apparatus (56, 72) are oriented with the plane of their respective equilateral triangles in the vertical plane of an aircraft including turbine engine (10), as the aircraft climbs or dives the upper inlet port(s) will be opened and the lower inlet port(s) always closed. Consequently, the valve member (56) employed within the tank (46) always maintains open the upper inlet port(s) respectively connecting with the inlet tubes (58–62), so that gas may be vented from the upper portion of the tank (46). On the other hand the valve apparatus (72) has its open inlet ports connected always with a tube extending from that open inlet port to a lower portion of the respective fuel tank (66). Consequently, air-free liquid fuel may be delivered from the fuel tank (66) to the combustion turbine engine via the conduit (80), pump (82), and conduit (84) including fuel controller (86).

Figure 4:
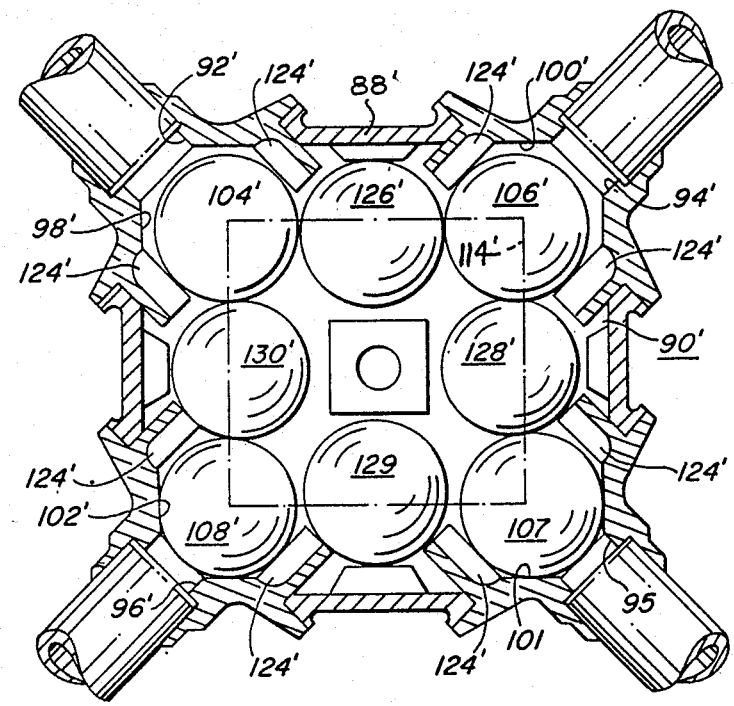
FIG. 4 depicts a partially cross-sectional view of an alternative embodiment of the invention.

Viewing now FIG. 4, it may be seen that the invention may be embodied in a valve apparatus employing as its controlling geometry not an equilateral triangle but a square. That is, the valve apparatus depicted in FIG. 4 is based upon a regular polygon having four equal sides and four equal angles rather than the equilateral triangle geometry of the polygon upon which the embodiment of FIGS. 2 and 3 is based. In order to obtain reference numerals for use in connection with the depiction of the embodiment of FIG. 4, reference numerals employed above in connection with the embodiments of FIGS. 2 and 3 are used with a prime added thereto. Viewing now the embodiment of FIG. 4, it will be seen that the valve apparatus includes a housing (88') defining therein a chamber (90'). The housing defines four inlet ports (92'), (94'), (95), and (96') opening into the chamber (90'), a respective valve seat (98'), (100') (101), and (102') is defined at each one of the inlet ports.

Four metallic ball valve members (104'), (106') (107), and (108') are movably received in the housing chamber (90') and are guided along respective paths extending from the apices of the square (114') to the center thereof by respective ribs (124'). Four space maintaining and weight transfer members (126'), (128'), (129), and (130') are also movably received in the chamber (90') and are guided along respective paths extending between adjacent apices of the square. Thus it will be seen that, similarly to the embodiment depicted by FIGS. 2 and 3, the embodiment depicted by FIG. 4 will in response to rotational movement thereof in the plane of the square (114') always maintain the upper one or two of the inlet ports open while maintaining the lower two or three of the inlet ports closed. Thus the embodiment of FIG. 4 may be employed in the tank wherein it is desired, because of the configuration of the tank, to provide locations of four vents or four liquid pickups.

Figure 5:
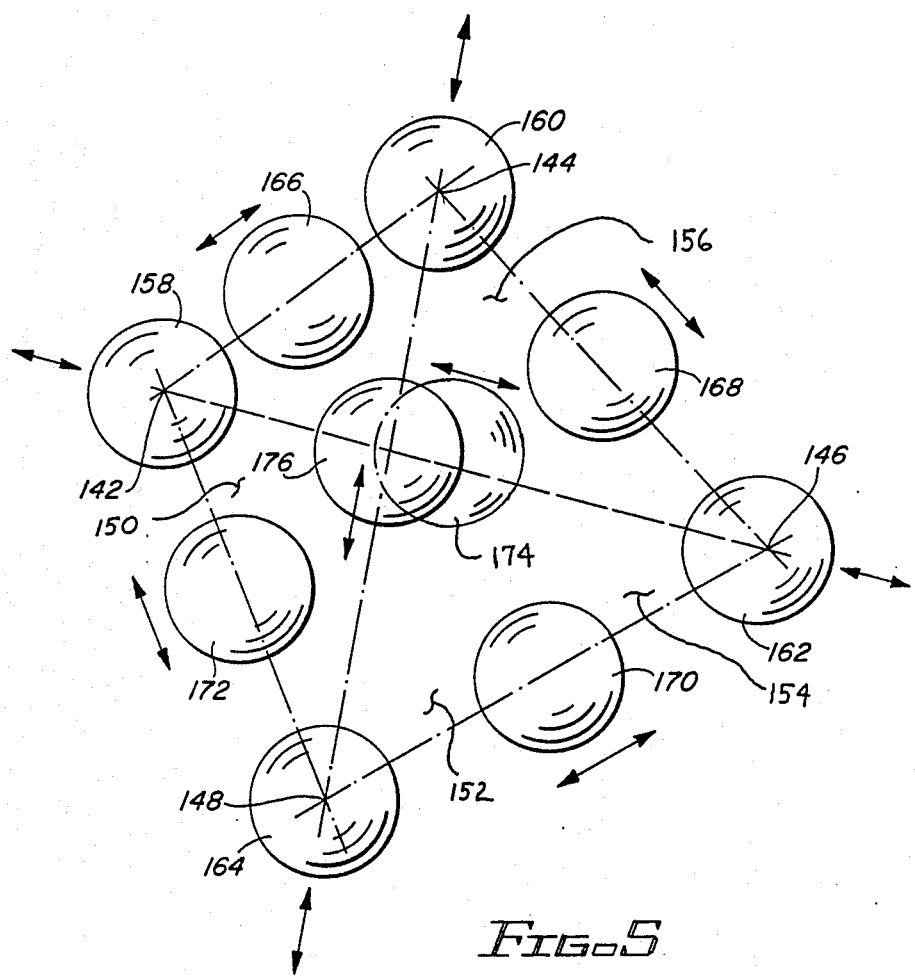
FIG. 5 depicts the controlling geometry of yet another alternative embodiment of the invention.

Having observed the structure and operation of the embodiments of FIGS. 2–4, and appreciated that their embodiments are based upon a planar regular polygon of three or four sides (i.e. an equilateral triangle or a square), attention now to FIG. 5 will reveal that the invention may be embodied in a three dimensional geometry. FIG. 5 presents a perspective view of the geometry of a valve device based upon a regular tetrahedron, having four vertices (142–148) and four faces (150–156). That is, face (150) is defined by the plane of vertices (142), (144), (148): face (152) by the vertices (144), (146), (148); face (154) by the vertices (142), (146), (148); and face (156) by the vertices (142), (144), (146). Each of the four faces (150–156) is an equilateral triangle. At each of the vertices a valve ball (158–164) is constrained to move along a path extending from the respective vertex to the centroid of the geometric figure between first and second positions, closing and opening respective ports (not shown). Similarly, intermediate of each adjacent pair of the valve balls (158–164), one of a respective six space maintaining weight transfer balls (166–176) is movable along a path extending between the adjacent vertices. For ease of illustration, the housing of the valve device of FIG. 5 is not depicted. However, in view of the disclosure above of the salient features of the embodiments of FIGS. 2–4, the geometric representation provided by FIG. 5 of the spatial interrelationships of the valve balls and space maintaining weight transfer balls will suffice to allow one ordinarily skilled in the pertinent art to make and use the embodiment of FIG. 5.

In view of the above, it is easily seen that each face (150–156) of the valve device of FIG. 5 defines a valve apparatus like that of FIGS. 2 and 3, and which operates the same with respect to rotation of the valve device in the plane of the respective face. The valve device of FIG. 5 provides four ports controlled individually by the four balls (158–164) such that the upper one, two, or three ports are open while the lower one, two, or three ports are closed dependent upon the rotational position of the valve device with respect to the prevailing acceleration vector or downward direction of the vertical. An advantage of the valve device depicted by FIG. 5 is that an aerobatic aircraft may perform maneuvers in addition to those in the pitch plane. That is the aircraft may roll and possibly sustain knife-edge maneuvers which impose different venting and liquid pickup conditions than do pitching maneuvers. Depending upon the capabilities of the aircraft and the configuration of the tank to be vented, or from which liquid is to be picked up, use of the three dimensional valve device of FIG. 5, rather than the planar embodiments of FIGS 2-4, may be desirable.

What is claimed is:

1. Gravity and acceleration responsive valve apparatus comprising:
a chambered housing, said housing defining a plurality of inlet ports opening to said chamber, said inlet ports being disposed generally in a plane and each at an apex of a regular polygon, at least one outlet port opening from said chamber, a matching plurality of valve members movable in said chamber and each sealingly engageable with said housing at a respective one of said plurality of inlet ports to close the latter, said housing including guide means for coacting with each one of said plurality of valve members to allow linear movement thereof substantially only along a path generally in said plane and extending between the respective apex and the centroid of said regular polygon, and space maintaining weight transmitting means movably disposed in said chamber for on the one hand maintaining a predetermined minimum spacing between adjacent ones of said plurality of valve members and on the other hand transmitting the weight of upper ones of said valve members to lower ones thereof to urge the latter into sealing engagement with said housing.

2. The invention of claim 1 wherein each of said plurality of valve members is a spheroid.

3. The invention of claim 2 wherein said space maintaining weight transmitting means includes a plurality of spheroid members interposing individually between adjacent ones of said plurality of valve members.

4. The invention of claim 3 wherein said housing further includes second guide means for coacting with each one of said plurality of spheroid members for guiding the latter individually along respective linear paths extending substantially between adjacent apices of said regular polygon.

5. The invention of claim 1 wherein said regular polygon is an equilateral triangle.

6. The invention of claim 1 wherein said regular polygon is a square.

7. Valve apparatus responsive to gravity and acceleration, said valve apparatus comprising a housing, said housing defining a cavity therein having a selected geometric shape, said selected geometric shape being one of a regular polygon or a regular polyhedron, a plurality of inlet ports each opening to said cavity in a respective valve seat individually at a vertex of said polyhedron or at an apex of said regular polygon, a matching plurality of valve members each in a respective first position sealingly engageable with said housing at a respective one of said plurality of inlet ports to close the latter, said housing further including guide means for guiding each respective one of said plurality of valve members substantially only along a linear path extending between the respective vertex or apex and the geometric centroid of said polyhedron or polygon to a second location wherein said valve member is unseated to open the respective inlet port, an outlet port opening to said cavity, and space maintaining weight transfer means movably disposed in said cavity for both maintaining a predetermined minimum spacing between adjacent ones of said valve members and transferring weight from upper ones of said plurality of valve members to lower ones thereof to assist sealing engagement of the latter with said housing.

8. The invention of claim 7 wherein said regular polyhedron is a tetrahedron.

9. The invention of claim 7 wherein said regular polygon is one of a triangle or square.

10. The invention of claim 7 wherein both said plurality of valve members and said space maintaining weight transfer means consists of a certain number of substantially identical balls.

11. The invention of claim 10 wherein the following tabulation applies relating geometry of said valve device with respective members of valve balls and weight transfer balls:

| Valve Geometry | No. of Valve Balls | No. of Weight Transfer Balls |
| --- | --- | --- |
| Equilateral triangle | 3 | 3 |
| Square | 4 | 4 |
| Tetrahedron | 4 | 6 |

12. The method of venting gas from a partially full liquid tank having a gas-filled ullage, or of picking up gas-free liquid from such a tank, said method comprising the steps of:
  employing a valve body to define a cavity having a regular polygonal or regular polyhedral shape:
  defining an inlet port and a respective inward disposed valve seat at each apex or vertex of said polygon or polyhedron, respectively:
  providing a plurality of movable valve balls in said cavity, each sealingly engageable with said housing at a respective one of said valve seats:
  providing guide means guiding each of said plurality of valve balls linearly along a path extending generally between said respective apex or vertex and the geometric centroid of said polygon or polyhedron;
  providing movable space maintaining weight transfer means for both maintaining a certain minimum distance between adjacent ones of said valve balls and for transferring weight from upper ones of said plurality of valve balls to lower ones thereof to sealingly engage the latter with said housing at said respective valve seats;
  employing respective ones of said plurality of valve balls to sealingly close all lower inlet ports while unseating a selected number of upper balls from said respective valve seats to open the associated inlet ports; and
  providing fluid flow connection from each of said open inlet ports to one of a respective high location or low location of said tank for venting or liquid pickup, respectively.

13. The method of claim 12 further including the step of selecting an equilateral triangle as said polygon.

14. The method of claim 12 further including the step of selecting a square as said polygon.

15. The method of claim 12 further including the step of selecting a tetrahedron as said polyhedron.

16. The method of claim 12 wherein said step of providing space maintaining weight transfer means includes the steps of movably intercalating one of a plurality of spacer ball members between adjacent ones of said plurality of valve balls, and guiding each of said spacer balls linearly along a respective path extending between the respective adjacent vertices or apices.

17. The method of claim 16 further including the step of selecting said valve balls and said spacer balls from a multitude of substantially identical ball members.

18. Valve apparatus responsive to gravity, said apparatus comprising: a housing defining an internal cavity, a plurality of inlet ports opening to said cavity at respective ones of the apices or vertices of a regular polygon or regular polyhedron, said housing defining one of a respective plurality of inwardly disposed valve seats at each of said plurality of inlet ports, said valve seats each being disposed generally perpendicularly to a line extending between the respective apex or vertex and the geometric centroid of said polygon or polyhedron, a plurality of movable weighty and non-buoyant valve balls each in a respective first position sealingly engaging a respective one of said plurality of valve seats to close communication through the associated inlet port, guide means for guiding each of said plurality of valve balls linearly along a path extending generally between the respective apex or vertex and said centroid, and movable space maintaining weight transfer means for both maintaining a selected minimum distance between adjacent ones of said plurality of valve balls and for transferring weight from upper ones of said plurality of valve balls to lower ones thereof to both sealingly engage the latter with said housing and to allow movement of said upper valve balls to a second position wherein the latter are unseated and the respective inlet port opened, said housing defining an outlet port opening from said cavity.

19. The invention of claim 18 wherein said space maintaining weight transfer means comprises a second plurality of spherical members movably interposing each one between adjacent ones of said plurality of valve balls, and second guide means guiding each one of said second plurality of spherical members linearly along a path generally extending between adjacent apices or vertices.

20. The invention of claim 19 wherein said plurality of valve balls and said second plurality of spherical members all consist of substantially identical metallic balls.

21. The invention of claim 18 wherein said regular polygon or regular polyhedron is one of an equilateral triangle, a square, or a tetrahedron.

22. The invention of claim 18 further including flow path means for communicating each of said inlet ports individually with a respective high location or low location within a tank, said tank having both ullage and liquid therein.

* * * * *